US007451407B2

(12) United States Patent
Brodie et al.

(10) Patent No.: US 7,451,407 B2
(45) Date of Patent: Nov. 11, 2008

(54) PRESENTATION OF GROUPS OF ITEMS

(75) Inventors: Alexander Brodie, Redmond, WA (US); Benjamin Truelove, Lynnwood, WA (US); David Parlin, Redmond, WA (US); Jae Pum Park, Sammamish, WA (US); Scott Dart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 11/290,748

(22) Filed: Nov. 30, 2005

(65) Prior Publication Data

US 2007/0124695 A1    May 31, 2007

(51) Int. Cl.
*G06F 3/048* (2006.01)
(52) U.S. Cl. .................. 715/828; 715/762; 715/829; 715/830
(58) Field of Classification Search .......... 715/828–830
See application file for complete search history.

(56) References Cited

U.S. PATENT DOCUMENTS

| | | | |
|---|---|---|---|
| 5,588,107 A | 12/1996 | Bowden et al. | |
| 5,715,416 A | 2/1998 | Baker | |
| 5,890,131 A * | 3/1999 | Ebert et al. | 705/7 |
| 5,903,309 A * | 5/1999 | Anderson | 348/333.02 |
| 5,923,328 A | 7/1999 | Griesmer | |
| 6,205,453 B1 | 3/2001 | Tucker et al. | |
| 6,380,957 B1 | 4/2002 | Banning | |
| 6,538,698 B1 * | 3/2003 | Anderson | 348/333.05 |
| 6,738,084 B1 * | 5/2004 | Kelley et al. | 715/784 |
| 6,816,175 B1 | 11/2004 | Hamp et al. | |
| 6,907,575 B2 * | 6/2005 | Duarte | 715/784 |
| 7,171,113 B2 * | 1/2007 | Parulski et al. | 396/287 |
| 2005/0166149 A1 * | 7/2005 | Frigon et al. | 715/712 |
| 2005/0166156 A1 | 7/2005 | Frigon et al. | |
| 2005/0177801 A1 | 8/2005 | Vronay et al. | |
| 2006/0149768 A1 * | 7/2006 | McCormack et al. | 707/101 |

OTHER PUBLICATIONS

Kent Wittenburg & Eric Sigman; Visual Focusing and Transition Techniques in a Treeviewer for Web Information Access; 1997-IEEE Symposium on Visual Languages.
2003-2005—Divelements Limited; Eyefinder Overview.
ActiveListBar Email; Lifeboat Distribution.

* cited by examiner

*Primary Examiner*—Sy D. Luu
*Assistant Examiner*—Anil N Kumar
(74) *Attorney, Agent, or Firm*—Shook, Hardy & Bacon L.L.P.

(57) ABSTRACT

A system, a method and computer-readable media for presenting groups of items to a user. Items are divided into groups, and a group header is associated with each group. The items and group headers are presented on a screen display, and the displayed content is subject to navigational requests from a user. When one of the group headers is located near an edge of the screen display, its position is fixed to prevent the header from being removed from the screen display.

20 Claims, 8 Drawing Sheets

PRESENTATION OF GROUPS OF ITEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Providing computer users with useful and understandable interfaces for navigating information presented upon a computer display has become increasingly important as the amount of information stored in computing environments has grown. In recent years, computers have become able to handle more and more files, and the type of stored information has diversified to include pictures, music, documents, and other media.

With the proliferation of stored information, items are commonly organized in groups for presentation to a user. These groups often rely on a characteristic shared by each item in the group. For example, a set of digital photographs may be organized by the date taken. By presenting items in groups, the user may efficiently navigate among numerous items in an organized fashion.

While a number of existing interfaces are capable of presenting items in groups, there are currently no adequate techniques for displaying information associated with the displayed groups. For example, a presentation may display items, such as digital images, in groups. Above each group displayed in this presentation, a group header may provide information describing the group items. However, as a user navigates through the presented items, the group header may be removed from view while items associated with the header are still being displayed. In this instance, the user may lose track of which are items are being displayed and may have to navigate back to the group header. In a scrolling view, the group header may no longer be visible if the user scrolls even a small amount. In this case, it is not readily apparent what group the user is viewing. As group headers in existing interfaces are freely navigable along with the presented content, these headers do not always provide information about the presented groups and often do not aid the user in navigation of the presented groups.

SUMMARY

The present invention meets the above needs and overcomes one or more deficiencies in the prior art by providing systems and methods for presenting groups of items to a user. In one embodiment, items are divided into groups, and a group header is associated with each group. The items and group headers are presented on a screen display, and the displayed content is subject to navigational requests from a user. When one of the group headers is located near an edge of the screen display, its position is fixed to prevent the header from being removed from the screen display.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for the presentation of items on a computer. An exemplary operating environment for the present invention is described below.

Figure 1:
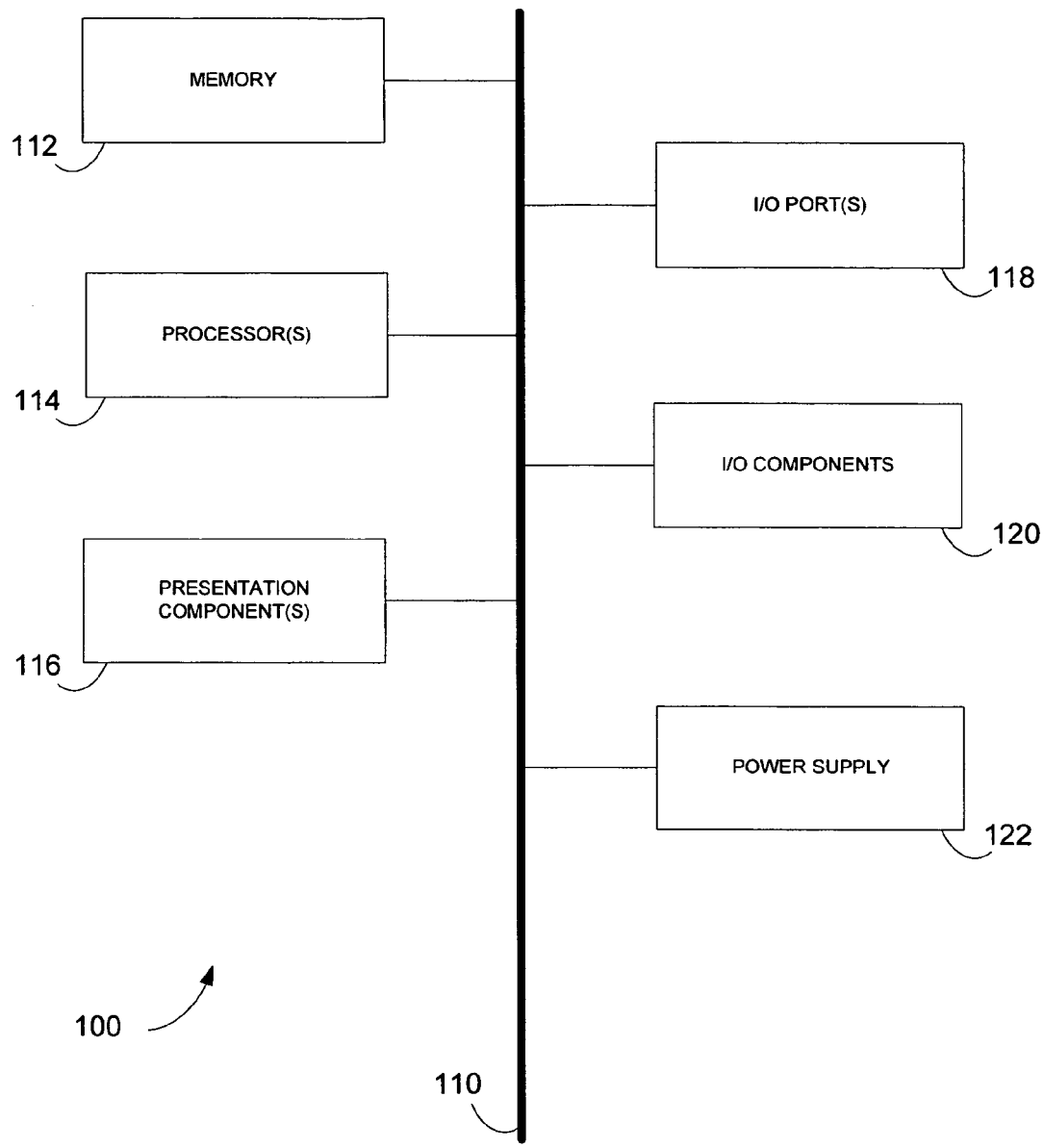
FIG. 1 is a block diagram of a computing system environment suitable for use in implementing the present invention.

Referring initially to FIG. 1 in particular, an exemplary operating environment for implementing the present invention is shown and designated generally as computing device 100. computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, the current invention relates to an improved interface for the presentation of items on a computer. An item may be any piece of content displayable to a user or any piece of content having a graphical representation that may be displayed to a user. For example, an item may be a digital image, a grouping of letters or symbols (e.g., a word) or a file having an associated icon or thumbnail view.

Figure 2:
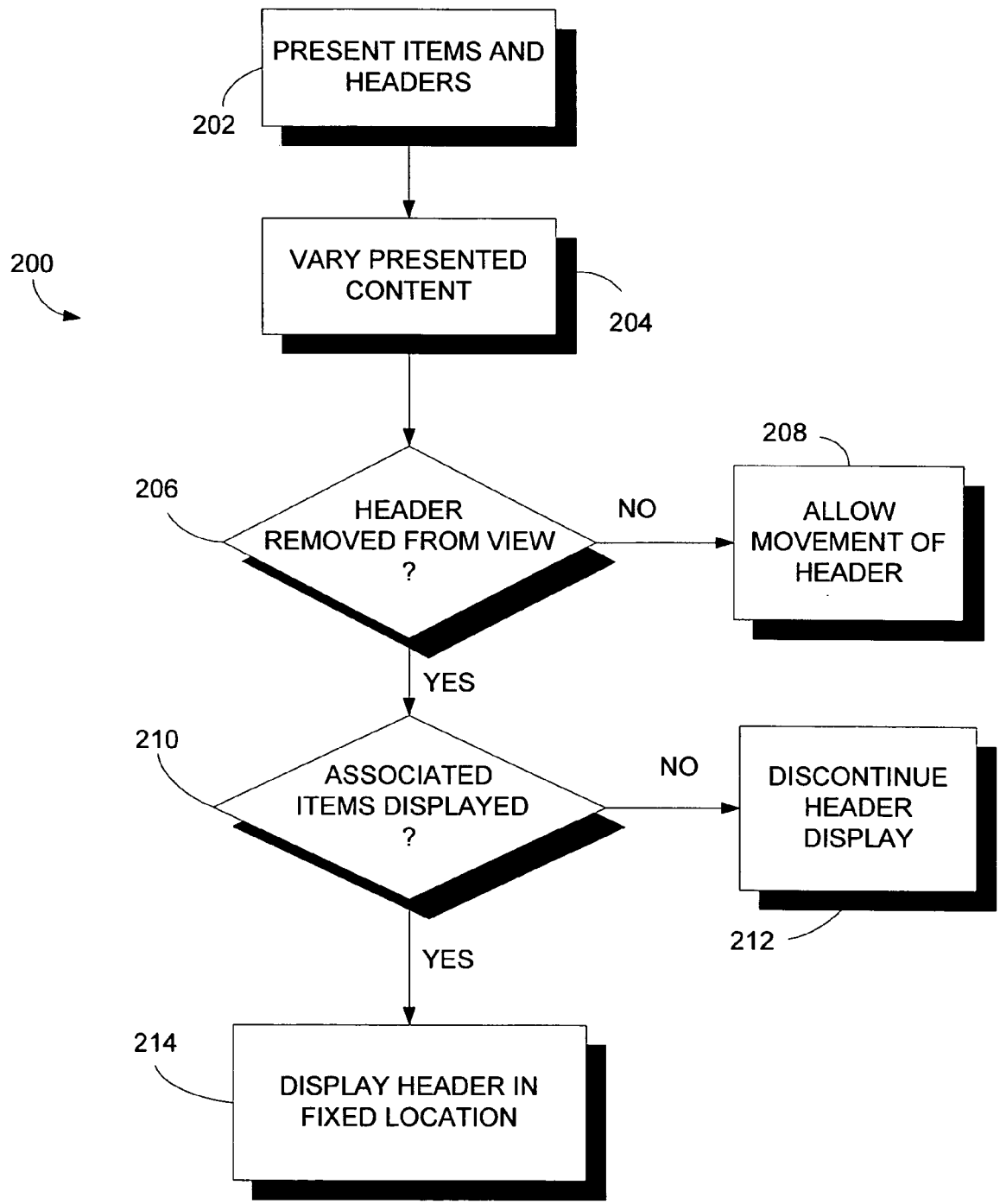
FIG. 2 illustrates a method in accordance with the present invention for presenting items to a user.

FIG. 2 illustrates a method 200 for presenting items to a user. At 202, the method 200 presents items and headers to the user in a screen display. Any presentation of items may be acceptable for the present invention, and the items may be organized in groups of similar items. For example, icons representing audio files may be presented in groupings according to artist. A group header may be presented along with each of the groups. A group header may be any presentation of information pertaining to a group of items. For example, the group header may indicate a characteristic shared by each of the group members. The group header may also include additional information related to the group, such as the number of items. Further, the group header may include additional controls, such as navigational controls or controls to select or deselect a group. Returning to the audio file example, a group header may be associated with each of the groups and may display the name of an artist associated with each group. It should be noted that the group header may be displayed in any location visible to the user and that the term "header" does not connote a particular origination for the group header. The group header, for example, may be displayed above the items, below the items or on either side of the items.

The method 200, at 204, varies the position of the items and headers presented at 202. In one embodiment, the items and headers are varied in response to a user input. Any number of user inputs may relate to the varying of presented content. For example, the input may be received via a mouse or keyboard and may indicate a user's desire to scroll through presented content. A user may indicate a desire to remove content from the display or to view items not presently in view. Those skilled in the art will appreciate that a user may make any number of inputs, and these inputs may request a variety of changes to the presentation of items and headers.

At 206, the method 200 determines whether any of the presented headers would be removed from the screen display in response to a user input. For example, a header may be located near the top edge of the screen display. After receiving a user's request to scroll down, this header would be moved off of the screen display and out of view. Alternately, the input may request for upward scrolling of the presented content. Responsive to this request, the header will be moved further down on the screen display.

When the header is not removed from the screen display, the method 200, at 208, allows movement of the header and does not fix its location. In this instance, the header is free to move within the screen display in response to user inputs.

When the header would be removed from the screen display, the method 200 determines whether items associated with the header are still presented on the screen display at 210. For example, if the group header is presented above each of the group items, a request to scroll down may remove the group header from view while items associated with the header are still presented.

If no associated items are displayed, the method 200, at 212, discontinues display of the header. As there are no items associated with the header currently visible, there is no need for the header to be displayed. In the alternative, if the method 200 determines at 210 that items associated with the header are currently visible, the removed header is displayed in a fixed location at 214. As will be appreciated by those skilled in the art, the fixed header allows the user to view information about the displayed items when group items are displayed to the user. In one embodiment, the header is displayed in the fixed location until all associated items are removed from the screen display.

Figure 3A:
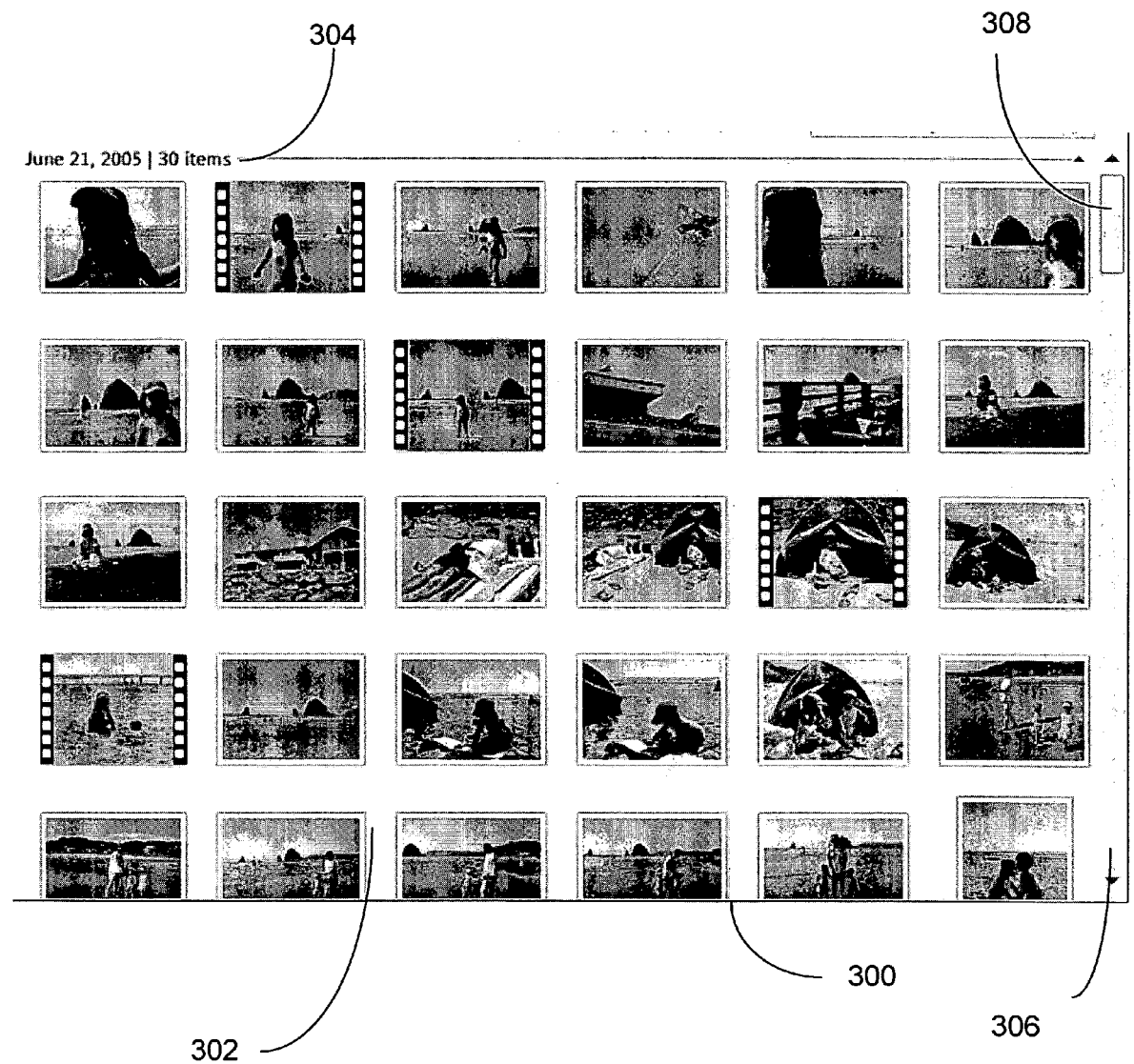
FIGS. 3A-3E are screen displays of a graphical user interface in accordance with one embodiment of the present invention in which items are presented in groupings.

FIGS. 3A-3E present a screen display 300, which provides an exemplary screen view in accordance with one embodiment of the present invention. Turning to FIG. 3A, the screen display 300 includes an item presentation area 302. The item presentation area 302 presents items organized in groups. For example, the item presentation area 302 shows a variety of digital images. While FIG. 3A displays only a portion of a group of images, those skilled in the art will appreciate that a variety of context may be presented in the item presentation area 302.

The screen display 300 also includes a group header 304. The group header 304 indicates information about the items displayed in the item presentation area 302. For example, the group header 304 indicates that the presented images where taken on Jun. 21, 2005 and that there are 30 items in the group.

A scroll bar 306 is also included in the screen display 300. The scroll bar 306 includes a scroll indicator 308, which indicates the portion of a presentation being displayed. For example, the scroll indicator 308 is positioned at the top of the scroll bar 306. This indicates that the beginning of the presentation is currently visible and that additional content may be viewed by scrolling down. The scroll bar 306 is but one example of a navigation control that may be used with the present invention, and such scroll bars (including vertical and horizontal scroll bars) are well known in the art.

Figure 3B:
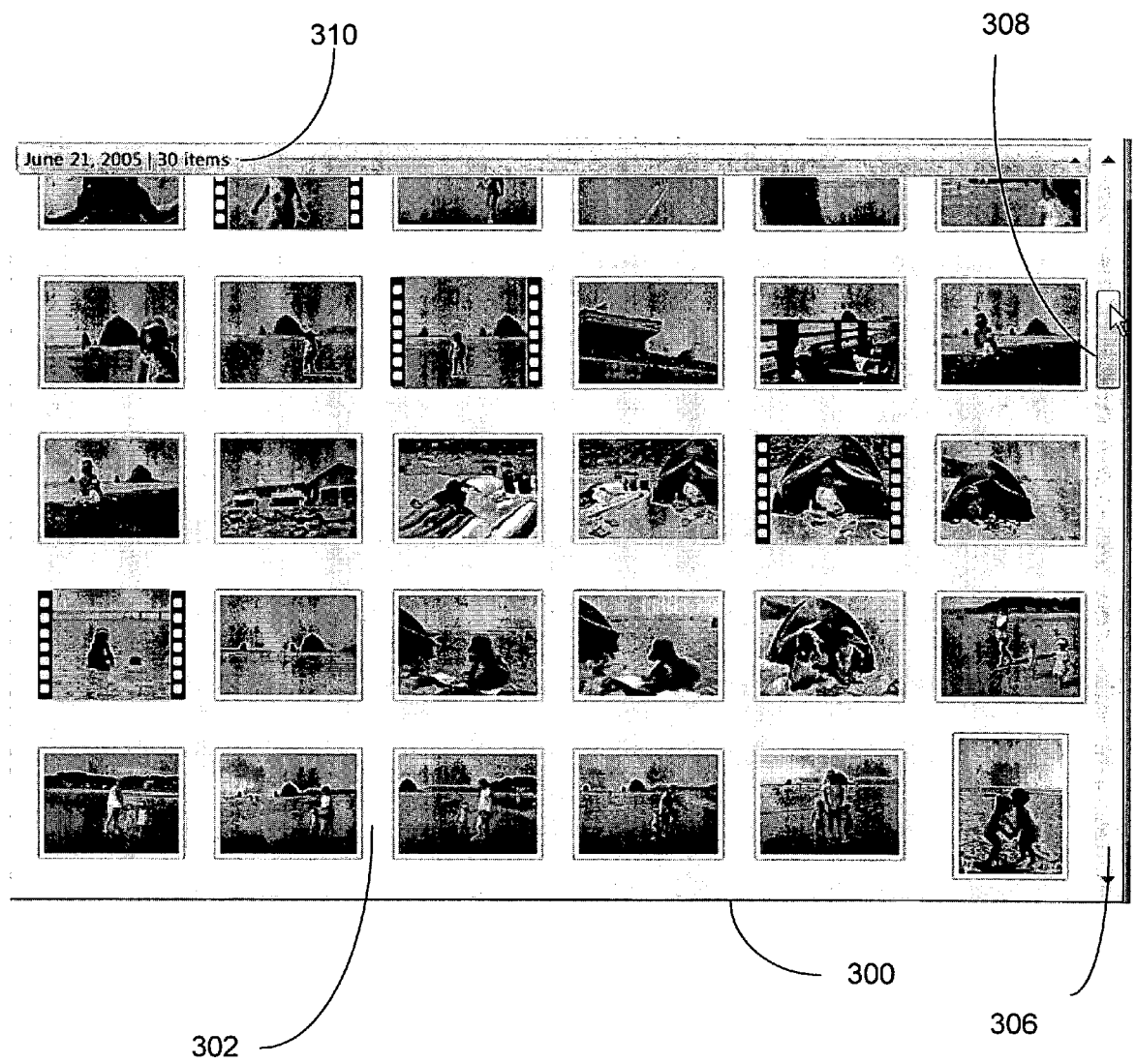

FIG. 3B presents a view of the screen display 300 after varying the displayed content in response to a user navigational input. As indicated by the scroll indicator 308, the content presented in the item presentation area 302 after the user scrolled down the content. Accordingly, a portion of the top images has been removed from view, while the bottommost images have been moved up into the item presentation area 302. Notably, the group header 304 of FIG. 3A has been replaced with a fixed header 310. The fixed header 310 is displayed in place of the group header 304, and the fixed header 310 is not subject to navigational inputs while images associated with the header 310 are still being presented in the item presentation area 302.

Figure 3C:
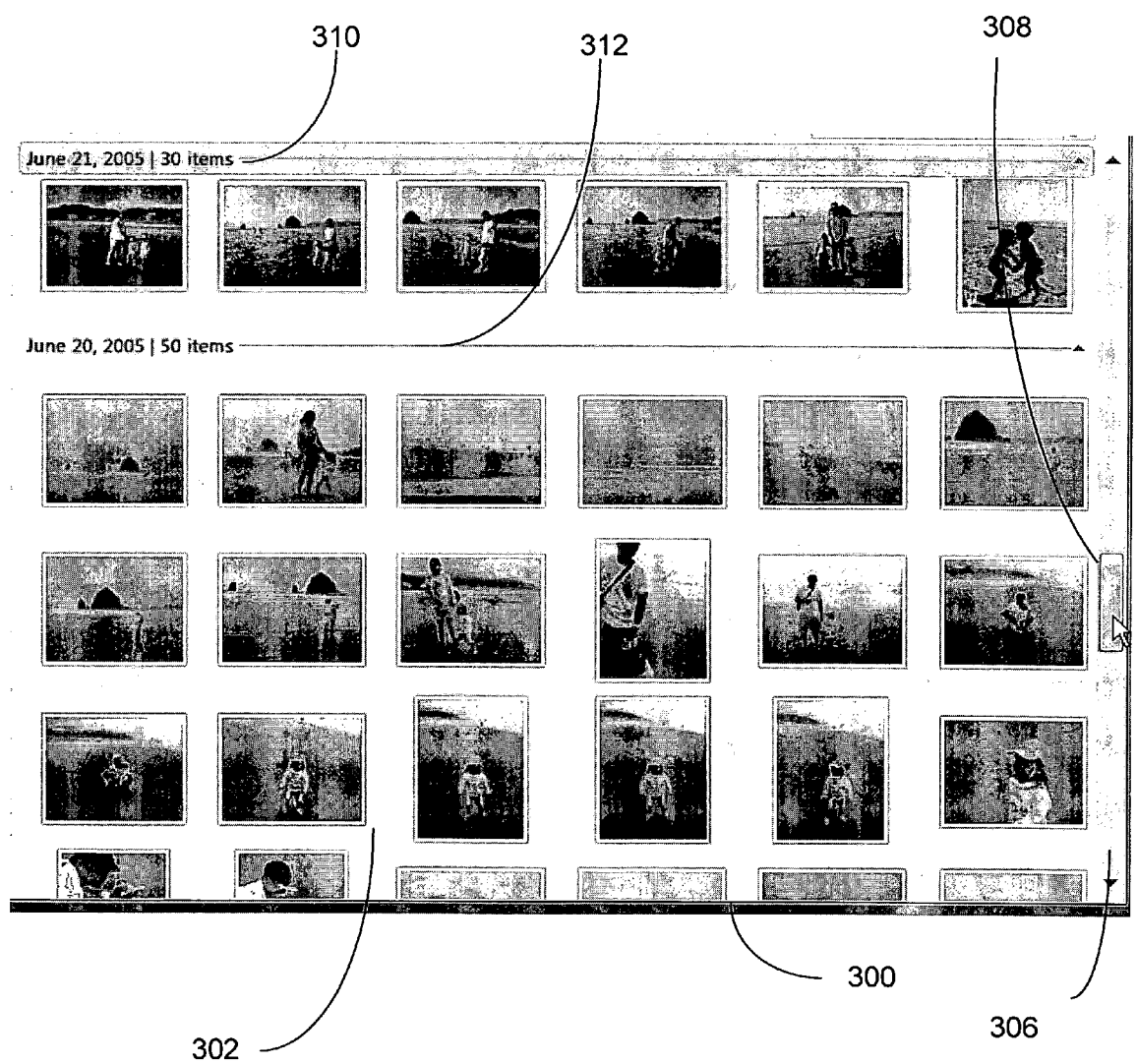

FIG. 3C shows the screen display 300 after additional downward scrolling (as indicated by the position of the scroll indicator 308). The screen display area 302 now displays portions of two groups. The first group includes images taken on Jun. 21, 2005, and the fixed header 310 continues to display information pertaining to this grouping. The second group includes images taken on Jun. 20, 2005, as indicated by a group header 312. The position of the group header 312 is variable and depends on the position of the scroll indicator 308 in the scroll bar 306.

Figure 3D:
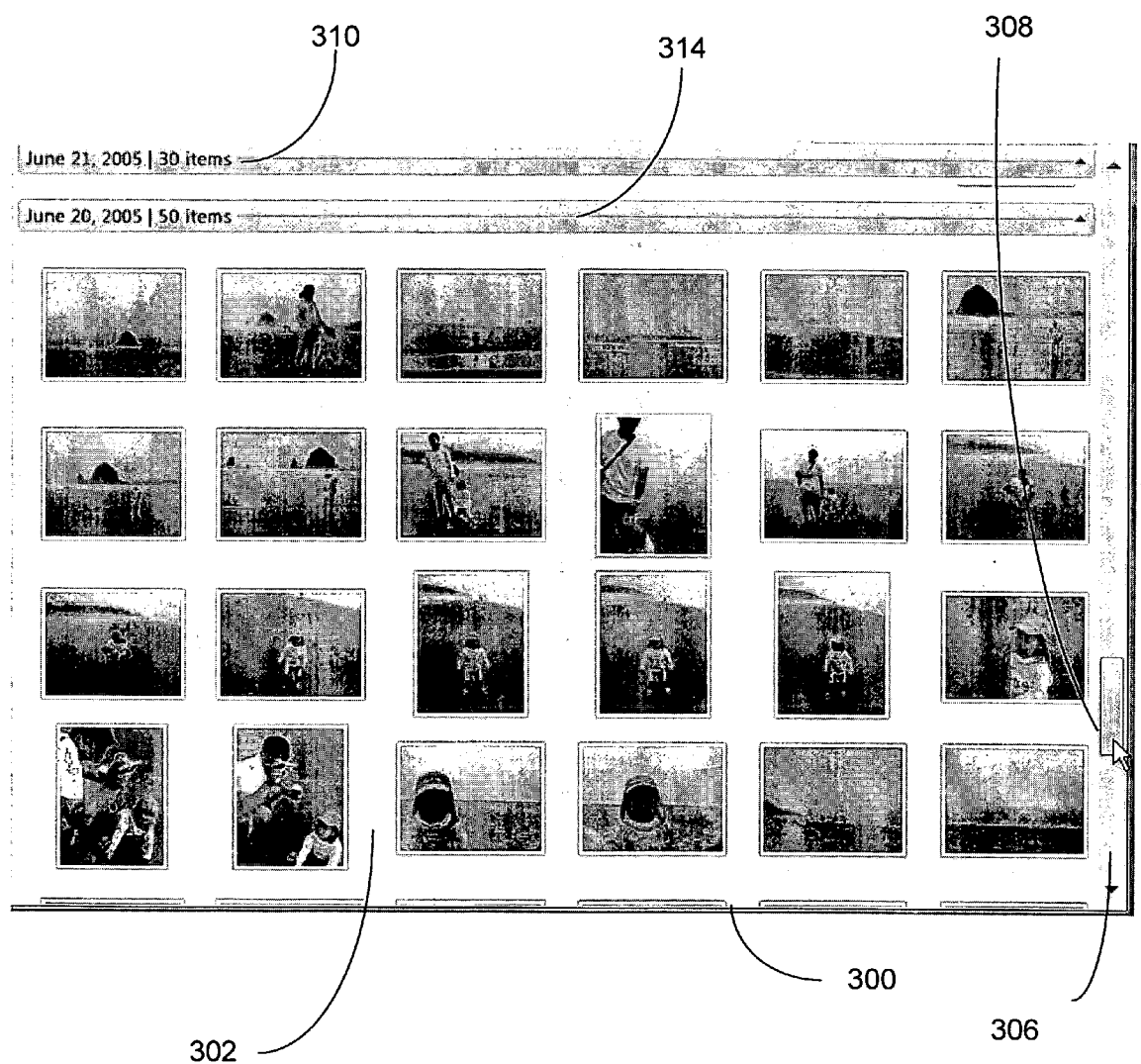

Another aspect of the screen display 300 is shown on FIG. 3D. FIG. 3D presents a transitional effect, which may be provided in accordance with the present invention. As the user navigates away from the images taken on June 21, a greater portion of the item presentation area 302 is dedicated to images taken on June 20. As the item presentation area 302 makes this transition, the fixed header 310 may be displayed until all the June 21 images are removed and an additional fixed header, a fixed header 314, is presented. During this transition, both the fixed header 310 and the fixed header 314 may be displayed. Further, as shown by FIG. 3D, multiple fixed group headers may be presented on the screen display 300. For example, headers may be placed at the top and the bottom of the screen display 300 to indicate the content of groups that are not currently visible.

Figure 3E:
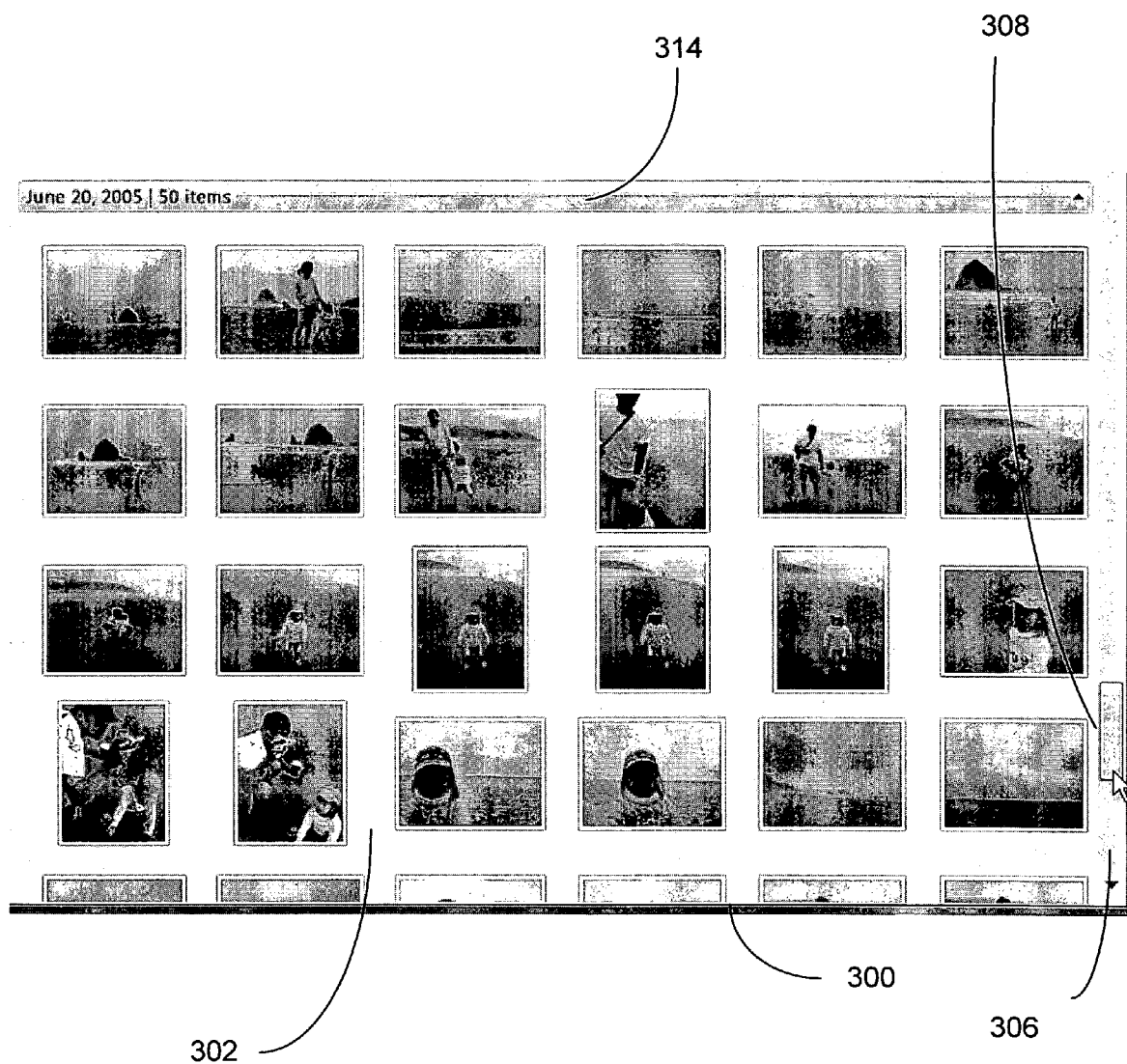

FIG. 3E presents the screen display 300 after each item associated with the Jun. 21, 2005 group has been removed from the item presentation area 302. As the fixed header 314 has reached the upper edge of the screen display 300, its location is fixed to prevent navigation off the display 300.

While FIGS. 3A-3E present the result of downward scrolling, the result of upward scrolling may be obtained by viewing the figures in the reverse order (i.e., starting with FIG. 3E and ending with FIG. 3A). It should be noted that FIGS. 3A-3E are provided as merely examples and that any number of screen displays and interfaces may be used in accordance with the present invention.

Figure 4:
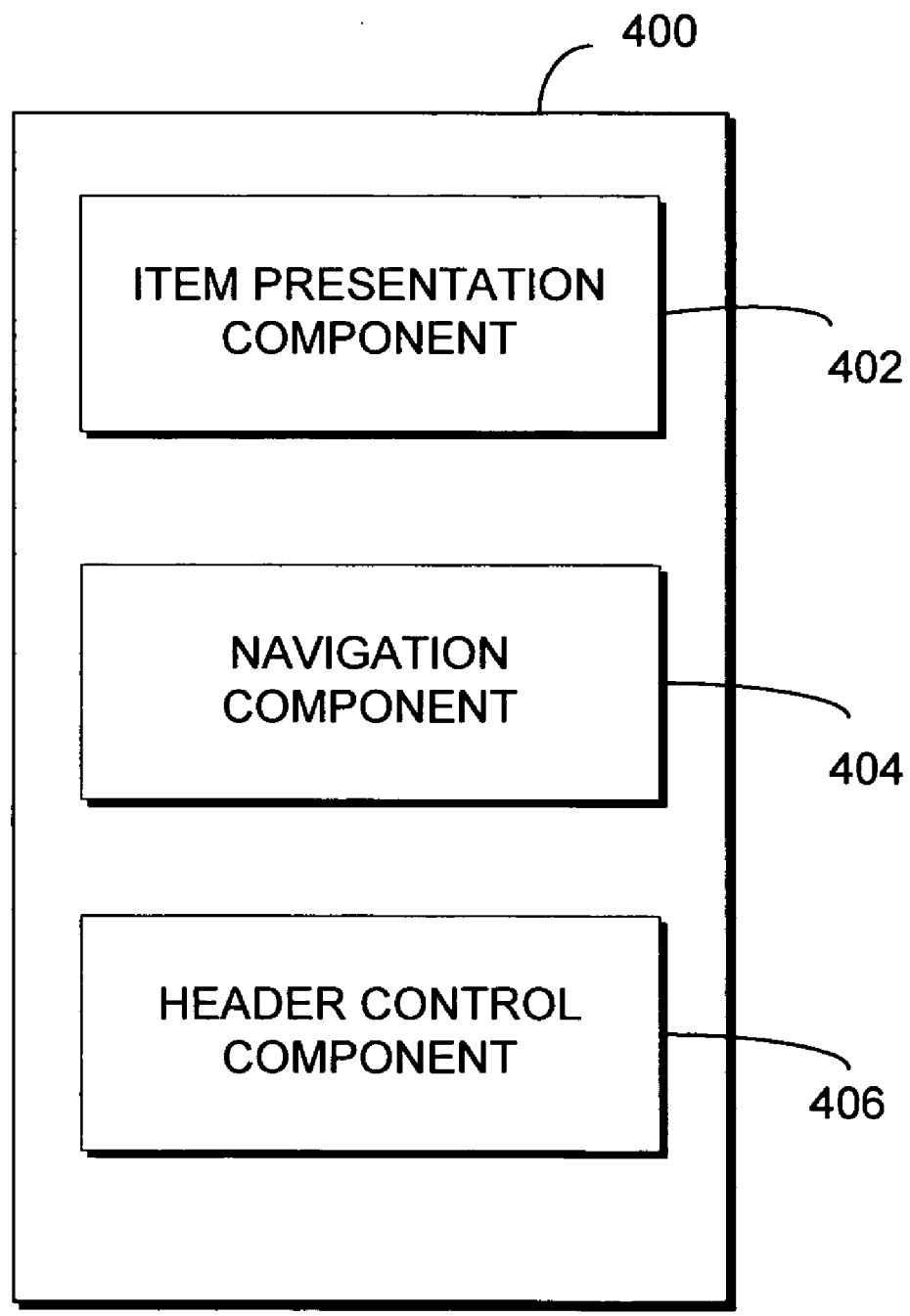
FIG. 4 is a schematic diagram illustrating a system for presenting items to a user in accordance with the present invention.

FIG. 4 illustrates a system 400 for presenting items to a user. The system 400 includes an item presentation component 402 that presents groups of items to the user in a screen display. Any number of items may be presented by the item presentation component 402, and the item presentation component 402 may interact with any number of user interfaces. For example, a word processing document may have words organized in groups such as sections of a document. As another example, icons representing files may be presented in groups related to storage location. Each of the presented groups may be associated with a group header, and these group headers may be displayed by the item presentation component 402, along with the presented items. For example, the item presentation component 402 may present a screen display such as display 300 of FIG. 3A.

The system 400 further includes a navigation component 404. The navigation component 404 may be configured to receive any number of inputs from a user. These inputs may be related to navigation of content presented by the item presentation component 402. For example, the navigation component 404 may receive a request to move a portion of the presented content off the screen display. In response to a user input, the navigation component 404 may comply with the input by varying the position of presented content. For example, the navigation component 404 may scroll a portion of the presented content off of the display area, while allowing presentation of previously un-displayed content.

A header control component 406 is also included in the system 400. The header control component 406 may be configured to display a selected group header in a fixed location. In one embodiment, the header control component 406 detects when one of the presented headers resides within a predetermined proximity of an edge of the display area. For example, the item presentation component 402 may detect when a header resides near the top edge of the screen area. In response to such header placement, the header control component 406 may fix the location of the header and may change its visual appearance. By fixing the location of the header, the header control component 406 ensures that the header is not removed from view of the user. In one embodiment, the fixed header remains in the fixed location until each item associated with the header has been removed from the screen area. Alternatively, the location of the header may be removed from the fixed location and allowed to move in response to a navigational input moving the header away from the top of the screen display.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A graphical user interface embodied on one or more computer-readable media and executable on a computer, said graphical user interface comprising:
   an item presentation area which displays one or more items and one or more group headers, wherein each of said one or more group headers is associated with at least one group of said one or more item, wherein said one or more group headers are repositioned within said item presentation area in response to one or more user navigational inputs; and
   a fixed header area which displays a selected group header while at least a portion of said one or more items associated with the selected group header are displayed in said item presentation area, wherein said selected group header is selected when said selected group header is navigated to a position within a predetermined proximity of an edge of said item presentation area in response to said one or more navigational inputs.

2. The graphical user interface of claim 1, wherein a position in said item presentation area of the displayed one or more items and one or more group headers are varied in response to said one or more user navigational inputs.

3. The graphical user interface of claim 1, wherein said one or more items are divided into one or more groups, and wherein each of said one or more group headers is associated with at least one of said one or more groups.

4. The graphical user interface of claim 1, wherein at least a portion of said one or more items are digital images.

5. The graphical user interface of claim 1, wherein said one or more navigational inputs include a request to scroll through content displayed in said item presentation area.

6. The graphical user interface of claim 5, wherein said selected group header is scrolled off of said item presentation area in response to said request.

7. The graphical user interface of claim 6, wherein said selected group header is displayed in said fixed header area in response to said request.

8. The graphical user interface of claim 1, wherein said selected group header is removed from said fixed header area when none of said one or more items associated with the selected group header are displayed in said item presentation area.

9. One or more computer-readable media having computer-useable instructions embodied thereon to perform a method for presenting items to a user, said method comprising:
dividing said items into one or more groups;
associating one or more group headers with each of at least a portion of said one or more groups;
presenting at least one of said items and at least one of said one or more group headers in a display area;
in response to one or more user navigational inputs, varying the position in the display area of the at least one presented item and a presented group header;
identifying when said presented group header is navigated to a position within a predetermined proximity of an edge of said display area; and
incident to said identifying, fixing the location of the presented group header while one or more items associated with the presented group header are presented in said display area, wherein said presented group header is fixed until none of the one or more items associated with the presented group header are presented in said display area.

10. The media of claim 9, wherein the method further comprises altering the visual appearance of said identified group header while the location of said identified group header is fixed.

11. The media of claim 9, wherein the method further comprises removing said identified group headed from said display area when none of the items associated with the identified group header are presented said display area.

12. The media of claim 9, wherein said dividing said items into said one or more groups includes identifying one or more group characteristics.

13. The media of claim 12, wherein at least a portion of said one or more group headers include information descriptive of said one or more group characteristics.

14. The media of claim 9, wherein at least a portion of said one or more user navigational inputs indicate a user's desire to scroll content displayed in said display area.

15. A computer system, tangibly embodied on one or more computer-readable media and executable on a computer, for presenting items to a user, the system comprising:
an item presentation component which presents at least a portion of one or more groups of said items and one or more group headers in a display area, wherein each of the one or more group headers are associated with at least one of said one or more groups, wherein said one or more group headers include text indicating a shared group characteristic;
a navigation component configured to remove from said display area at least a portion of said items and at least a portion of said one or more one group headers in response to at least one or more navigational inputs, said navigation component being further configured to reposition said one or more group headers within said display area in response to said one or more user navigational inputs; and
a header control component configured to identify when a presented group header is navigated to a position within a predetermined proximity of an edge of said display area, and being further configured to fix the location of the presented group header while said presented group header resides within said predetermined proximity, wherein said presented group header is fixed by the header control component until none of the one or more items associated with the presented group header are presented in said display area.

16. The system of claim 15, wherein said selected group header is displayed in a fixed location in said display area that is not varied in response to said one or more navigational inputs.

17. The system of claim 16, wherein said selected group header is removed from said fixed location when none said one or more groups associated with the selected group header are presented in said display area.

18. The system of claim 15, wherein at least a portion of said one or more navigational inputs include a request to scroll through content displayed in said display area.

19. The system of claim 15, wherein said selected group header is selected subsequent to removal of said selected group header from the presentation provided by said item presentation component.

20. The system of claim 15, wherein at least a portion of said items includes one or more words.

* * * * *